United States Patent [19]

Kawanaka et al.

[11] 3,908,048
[45] Sept. 23, 1975

[54] METHOD OF IMPROVING INTERFIBER COHESION OF FILAMENT YARNS

[75] Inventors: Hideo Kawanaka, Osaka; Kenichi Katabe, Wakayama; Seizi Kameda, Wakayama; Go Takemoto, Wakayama, all of Japan

[73] Assignee: Kao Soap Co., Ltd., Tokyo, Japan

[22] Filed: Apr. 6, 1973

[21] Appl. No.: 348,768

[30] Foreign Application Priority Data
Apr. 7, 1972  Japan................................ 47-34947

[52] U.S. Cl................... 427/377; 252/8.8; 252/8.9; 427/385; 427/390
[51] Int. Cl.²............................................ C08J 7/04
[58] Field of Search............... 117/139.5, 139.5 CQ, 117/139.5 A, 139.5 F, 161 P, 161 UZ; 252/8.6, 8.8, 8.9

[56] References Cited
UNITED STATES PATENTS

| | | | |
|---|---|---|---|
| 3,268,489 | 8/1966 | Dial................. | 117/139.5 X |
| 3,712,873 | 1/1973 | Zenk................ | 117/139.5 X |
| 3,770,495 | 11/1973 | Lenz et al......... | 117/139.5 X |
| 3,788,888 | 1/1974 | Kawanaka et al... | 117/139.5 |

*Primary Examiner*—Bernard D. Pianalto
*Attorney, Agent, or Firm*—Woodhams, Blanchard and Flynn

[57] ABSTRACT

The interfiber cohesion of filament yarns is improved by applying a fiber-treating agent to a filament yarn and aging, said fiber-treating agent consisting of (a) a high-molecular-weight surfactant (A) composed of a copolymer of an anhydride of an unsaturated dibasic acid with a vinyl compound copolymerizable therewith, in which a part of the acid groups are amidated by an aliphatic amine containing at least one aliphatic alkyl group having 1 to 22 carbon atoms and the remaining acid groups are converted to salts of an alkali metal, a lower amine, an alkanol amine or ammonia, and (b) at least one compound selected from the compounds expressed by the following general formulas (1) to (4):

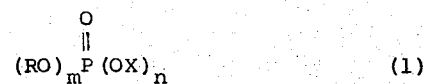

wherein R is an alkyl or alkenyl group having 8 to 18 carbon atoms or a residue of a condensate of 1 mole of a higher alcohol having 8 to 18 carbon atoms with 1 to 10 moles of ethylene oxide, X stands for a hydrogen ion, a metal ion, a residue of a polyethylene glycol (the mole number of ethylene oxide being 1 to 5), an ammonium ion or an organic group-substituted ammonium ion, and m and n stand for an integer of 1 to 2 with the proviso that the sum of $m$ and $n$ is 3;

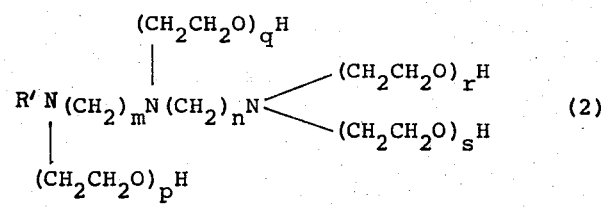

wherein R' is an alkyl, alkenyl or acyl group having 8 to 18 carbon atoms, $p$, $q$, $r$ and $s$ stand for an integer of 0 to 5 with the proviso that the sum of $p$, $q$, $r$ and $s$ is 1 or more, and $m$ and $n$ are an integer of 1 to 3;

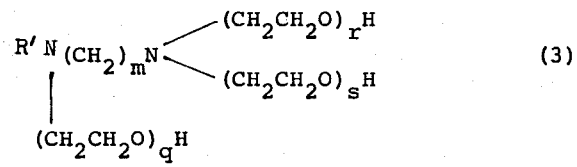

wherein R', $m$, $q$, $r$ and $s$ are as defined in above formula (2); and

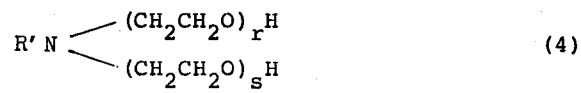

wherein R, $r$ and $s$ are as defined in above formula (2).

5 Claims, No Drawings

METHOD OF IMPROVING INTERFIBER COHESION OF FILAMENT YARNS

BACKGROUND OF THE INVENTION

1. Field of the Invention

This invention relates to a method of improving the interfiber cohesion of filament yarns and a fiber treating agent composition suitable for use in such method.

More particularly, the invention relates to a method of improving the interfiber cohesion of filament yarns which comprises treating a filament yarn of a manmade fiber such as regenerated cellulose, acetate, nylon, polyester and polyolefin fibers, with a specific fiber-treating agent composition.

2. Description of the Prior Art

For the rationalization of fiber-manufacturing and fiber-processing steps, omission of such steps as sizing and twisting steps has been considered and examined, and in omitting such steps, great importance is attached to prevention of occurrence of fluffs in fibers.

Accordingly, oiling agents to be used in fiber-manufacturing and fiber-processing steps are required to impart a sufficient interfiber cohesive property to filament yarns. The interfiber cohesive property referred herein means the interfiber cohesive property required at the filament-manufacturing steps and does not mean the interfiber cohesive property required at the staple-manufacturing (spinning) steps.

Natural pastes such as wheat starch, sweet potato starch, potato starch, sodium alginate and laver, and synthetic pastes such as carboxymethyl cellulose, polyvinyl alcohol, polyacrylic acid, polyvinyl acetate and polymethyl acrylate have been mainly used as agents for improving interfiber cohesion of filament yarns.

However, these fiber treating agents heretofore used have a defect that they reduce the fiber to metal lubrication. Therefore, they are disadvantageous in that they must be used, in general, in combination with lubricants called sizing oils. They are also defective in that it is difficult to accomplish scouring of fibers treated with such agents in a short period of time.

SUMMARY OF THE INVENTION

This invention has been achieved as a result of research works made with a view to providing a method for overcoming these defects of the conventional techniques, and the gist of this invention resides in a method of improving the interfiber cohesion of filament yarns characterized by applying 0.5 to 3% by weight of a fiber-treating agent composition to a filament yarn, said fiber-treating agent composition consisting essentially of (a) a high-molecular-weight surfactant (A) composed of a copolymer of an anhydride of an unsaturated dibasic acid with a vinyl compound copolymerizable therewith, in which a part of the acid groups are amidated by an aliphatic amine containing at least one aliphatic alkyl group having 1 to 22 carbon atoms and the remaining acid groups are converted to salts of an alkali metal, a lower amine, an alkanol amine or ammonia, and (b) at least one member selected from the following compounds (1) to (4):

1. compounds expressed by the general formula

wherein R is an alkyl or alkenyl group having 8 to 18 carbon atoms or a residue of a condensate of 1 mole of a higher alcohol having 8 to 18 carbon atoms with 1 to 10 moles of ethylene oxide, X stands for a hydrogen ion, a metal ion, a residue of a polyethylene glycol (the mole number of ethylene oxide being 1 to 5), an ammonium or an organic group-substituted ammonium ion, and $m$ and $n$ stand for an integer of 1 to 2 with the proviso that the sum of $m$ and $n$ is 3, 2. compounds expressed by the general formula

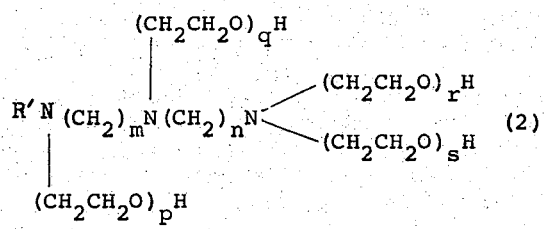

wherein R' is an alkyl, alkenyl or acyl group having 8 to 18 carbon atoms, $p$, $q$, $r$ and $s$ stand for an integer of 0 to 5 with the proviso that the sum of $p$, $q$, $r$ and $s$ is 1 or more, and $m$ and $n$ are an integer of 1 to 3, 3. compounds expressed by the general formula

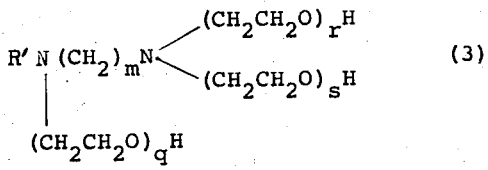

wherein R', $m$, $q$, $r$ and $s$ are as defined in above formula (2), and 4. compounds expressed by the general formula

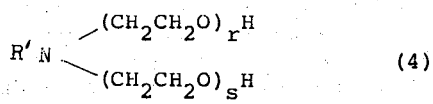

wherein R, $r$ and $s$ are as defined in above formula (2).

Examples of starting compounds to be used for preparing the high-molecular-weight surfactant (A) of this invention will now be described. As the unsaturated dibasic anhydride, there may be mentioned, for instance, maleic anhydride, itaconic anhydride, aconitic anhydride, citraconic anhydride, and anhydrides of substituted maleic acids such as chloromaleic acid and dimethylmaleic acid. Among them, maleic anhydride is preferred. As the vinyl compound copolymerizable with such unsaturated dibasic anhydride, there may be exemplified alkyl vinyl ethers such as vinyl methyl ether and vinyl decyl ether; olefins such as ethylene, propylene and diisobutylene; styrene and substituted styrene such as chlorostyrene, α-methylstyrene and vinyl toluene; acrylic acid, methacrylic acid and their esters with aliphatic alcohols (such as methyl alcohol, ethyl alcohol, propyl alcohol, hexyl alcohol, 2ethylhexyl alcohol, lauryl alcohol and stearyl alcohol); acrylamide, methacrylamide, acrylonitrile, methacrylonitrile, 1,3-butadiene, chloroprene, vinyl chloride, vinyl acetate, vinyl propionate and vinylidene compounds such as vinylidene chloride. Among them, diisobutylene, styrene, vinyl decyl ether and vinyl propionate are preferred.

As the aliphatic amine containing at least one aliphatic alkyl group having 1 to 22 carbon atoms, there may be mentioned, for example, methyl amine, ethyl amine, butyl amine, octyl amine, capryl amine, lauryl amine, myristyl amine, stearyl amine, oleyl amine, dioctyl amine, didodecyl amine and dihexadecyl amine. Among them, lauryl amine and octyl amine are preferred.

As the compound that reacts with the remaining acid groups to form salts, there may be exemplified alkali metals such as sodium and potassium, lower amines such as methyl amine, ethyl amine, diethyl amine, piperidine, hydrazine and morpholine, alkanol amines such as monoethanol amine and diethanol amine, and ammonia. Among them, potassium, ammonia, sodium and diethanol amine are preferred.

The ratio of the amidated carboxylic acid groups may be optionally selected so as to vary the hydrophilic-hydrophobic balance of the high-molecular-weight surfactant (A) depending on the intended use, but it is generally appropriate that the above ratio is within a range of from 5 to 95%.

The degree of polymerization of the high-molecular-weight surfactant (A) is not particularly critical in this invention, but a degree of polymerization ranging from 2 to 50 (the dibasic acid being taken as the unit) is useful and a degree of polymerization ranging from 3 to 20 is preferable. It is possible that the ratio of the unsaturated dibasic anhydride to the vinyl compound is adjusted within a range of from 5:1 to 1:5, but it is preferred that the said ratio is within a range of from 2:1 to 1:2. The optimum ratio is 1:1.

It is preferred that the fiber-treating agent composition of this invention comprises 10 to 50 parts by weight of the high-molecular-weight surfactant (A) and 90 to 50 parts by weight of at least one member selected from the group consisting of compounds expressed by above general formulas (1) to (4).

This invention will now be illustrated in more details by reference to Examples.

EXAMPLE 1

98 g (1 mole) of maleic anhydride and 112 g (1 mole) of diisobutylene were dissolved in 130 g of benzene, and 1.5 g of benozyl peroxide (BPO) was added to the solution. Then, they were reacted at 80° – 85°C for 7 hours. The reaction product was purified by subjecting it three times to the fractional precipitation with benzene-water system, and it was dried under reduced pressure to obtain a solid having a molecular weight of about 2000 and a degree of saponification of 282. Then, 200 g (1 equivalent) of the solid was collected and dissolved in 200 g of acetone, and 39.4 g (0.2 mole) of lauryl amine was added dropwise to the solution at 57° – 58°C over a period of 2 hours.

The reaction was further continued for 5 hours at 57° – 58°C to complete amidation.

The resulting product had a degree of saponification of 235 (as measured with respect to the solid). Thus, it was confirmed that 20% of the acid anhydride groups were amidated.

Since the resulting product took the form of an acetone solution, 1184 g of a 4.7% aqueous solution of potassium hydroxide was added to the acetone solution and the mixture was agitated at 50° – 60°C to effect neutralization. Then, the temperature of the solution was raised to 100°C to remove acetone therefrom. The so obtained product (high-molecular-weight surfactant (A)) was 20% aqueous solution of an end product having the following structure:

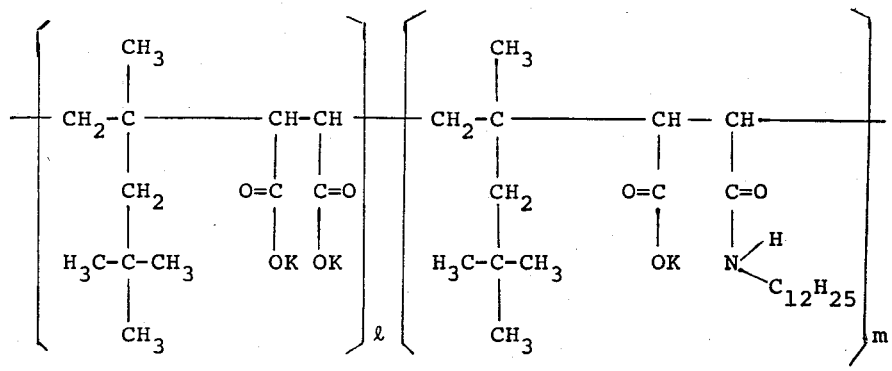

wherein the sum of $l$ and $m$ is 10 and the ratio of $m/(l+m)$ is 0.2.

2 parts by weight (calculated as active ingredient) of the above end product was mixed with 8 parts by weight of a compound expressed by the following formula (I)

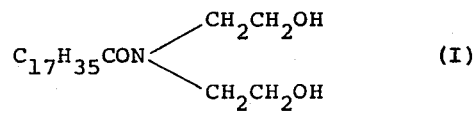

and the mixture was applied to a polyester multifilament yarn in an amount of 1% on the weight of fiber (owf). Then, the yarn was aged by allowing it to stand still at a temperature of 25°C and a relative humidity of 40% for more than 24 hours. The resulting yarn was used as the test sample.

The sample was cut into a length of 40 cm, and one end was fixed and 100 g of a load was imposed on the other end of the sample to maintain the sample under tension. In this state, the sample was cut at a point apart from 35 cm from the fixed end, and the length $x$ of the separated monofilament (the distance from the cutting point; expressed in centimeters) was measured. The interfiber cohesion was expressed as the cohesion ratio calculated from the measured length $x$ according to the following equation:

$$\text{cohesion ratio } (\%) = (1 - \frac{x}{35}) \times 100$$

Results of the measurement of the cohesion property made on the sample treated with above mixture and the comparative samples treated only with the compound of above formula (1) or the above high-molecular-weight surfactant are shown in Table 1.

EXAMPLE 3

A composition composed of 2 parts by weight of a compound (A) of the following formula

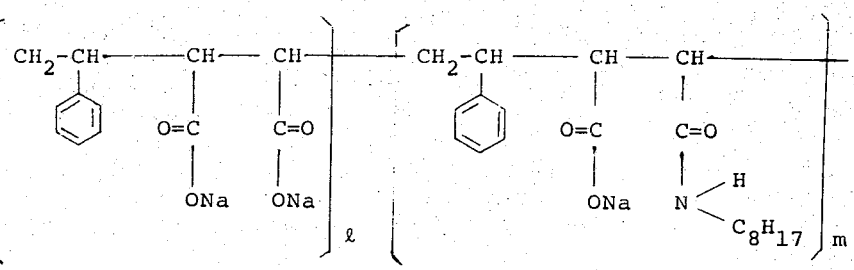

wherein the sum of $l$ and $m$ is 20 and the ratio of $m/(l+m)$ is 0.4, which was prepared in the same manner as described in Example 1, 2 parts by weight of a compound of the above general formula (1), in which R is $-C_8H_{17}$ and X stands for triethanol amine, and 6 parts of a compound of the above general formula (4), in which R is $-C_{12}H_{25}$ and the sum of $r$ and $s$ is 2, was applied in an amount of 1% (owf) to a polyester multi-filament yarn, and the yarn was aged at a temperature of 25°C and a relative humidity of 40% for more than 24 hours, to obtain a test sample.

The interfiber cohesion of the resulting sample was evaluated according to the same method as described in Example 1 to obtain results as shown in Table 3.

Table 1

| Sample | cohesion ratio (%) |
| --- | --- |
| Sample treated with above mixture | 99.6 |
| Comparative sample treated with compound (I) alone | 12.5 |
| Comparative sample treated with high-molecular-weight surfactant (A) alone | 0.0 |

EXAMPLE 2

A composition composed of 30 parts by weight of the mixture (interfiber cohesion improving agent composition) prepared in Example 1, 30 parts of mineral oil (70 seconds) and 10 parts by weight of polyoxyethylene oleyl ether ($\bar{P} = 5.5$) was applied in an amount of 0.7% (owf) to a melt-spun, unstretched nylon 6 yarn, and the yarn was aged at a temperature of 25°C and a relative humidity of 40% for more than 24 hours. Then, the yarn was stretched at a stretch ratio of 4 and the width of the spread of multifilaments on a stretch roll was measured to obtain a good result as shown in Table 2.

For comparison, a conventional composition composed of 60 parts by weight of mineral oil (70 seconds), 35 parts by weight of polyoxyethylene oleyl ether ($\bar{P} = 6$) and 5 parts by weight of potassium octyl-

Table 3

| Sample | cohesion ratio (%) |
| --- | --- |
| Sample treated with the above composition of Example 3 | 99.7 |
| Comparison (prepared in the same manner as in Example 3 except that compound (A) was not used) | 28.0 |

EXAMPLE 4

A composition composed of 25 parts by weight of an aqueous solution containing 10% by weight of a compound (A) of the following formula

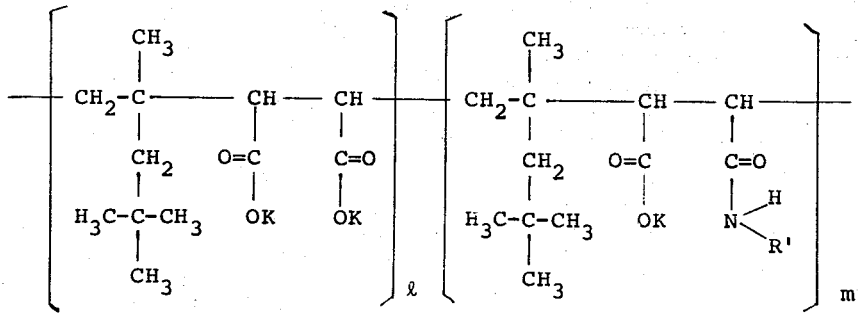

wherein the sum of $l$ and $m$ is 10, the ratio of $m/(l+m)$ is 0.2 and R' is a coconut alkyl group, which was prepared in the same manner as described in Example 1, 60 parts by weight of mineral oil (45 seconds), 20 parts by weight of a compound of the above general formula (2), in which R is $-C_{18}H_{37}$, the sum of $p$, $q$, $r$ and $s$ is 4, and $m$ and $n$ each are 3, and 17.5 parts by weight of polyoxyethylene oleyl ether ($\bar{P} = 5.5$) was applied in an amount of 2% by weight to an acetate filament yarn, and the yarn was aged at a temperature of 25°C and a relative humidity of 40% for 24 hours to obtain a sample. The interfiber cohesion of the sample was evaluated in the same manner as described in Example 1 to obtain results as shown in Table 4.

sesquiphosphate was applied to the yarn in the same manner as described above, and the width of the spread of multafilaments was measured.

Table 2

| Sample | Spread width on stretch roll |
| --- | --- |
| Sample treated with the above composition of this invention | 0.4 mm |
| Sample treated with comparative composition | 10 mm |
| stretch rate | 480 m/min |
| pin temperature: | 100°C |

Table 4

| Sample | cohesion ratio (%) |
| --- | --- |
| Sample treated with the above composition of Example 4 | 69.3 |
| Comparison (prepared in the same manner as in Example 4 except that compound (A) was not used) | 5.1 |

EXAMPLE 5

A yellow transparent composition was prepared by mixing 25 parts by weight of an aqueous solution containing 10% by weight of a compound (A) of the following formula

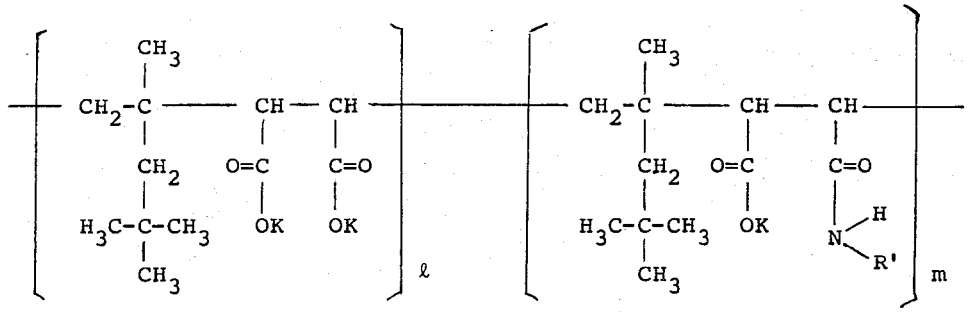

wherein the sum of $l$ and $m$ is 10, the ratio of $m/(l+m)$ is 0.2 and R' is a coconut alkyl group, which was prepared in the same manner as in Example 1, 60 parts of mineral oil (45 seconds), 4.5 parts by weight of a compound expressed by the above general formula (3), in which R is $-R_{18}H_{37}$, the sum of $q$, $r$ and $s$ is 3 and $m$ is 1, 8 parts of a compound expressed by the above general formula (4), in which R is $-C_{17}H_{33}$ and the sum of $r$ and $s$ is 2, 15 parts by weight of a compound expressed by the above general formula (1), in which R is $-C_8H_{17}$, $m$ and $n$ each of 1.5 and X is potassium, and 10 parts by weight of polyoxyethylene oleyl ether (P = 2).

This composition was applied in an amount of 2% by weight of an acetate filament yarn, and the yarn was aged at a temperature of 25°C and a relative humidity of 40% for 24 hours to obtain a test sample.

The interfiber cohesion of the so obtained sample was evaluated in the same manner as described in Example 1 to obtain results as shown in Table 5.

Table 5

| Sample | cohesion ratio (%) |
| --- | --- |
| Sample treated with the above composition of Example 5 | 72.4 |
| Comparison (prepared in the same manner as in Example 5 except that compound (A) was not used) | 13.3 |

The embodiments of the invention in which an exclusive property or privilege is claimed are defined as follows:

1. A method of improving the interfiber cohesion of filament yarns, which consists essentially of applying 0.5 to 3% by weight of a fiber-treating agent to a filament yarn, said fiber-treating agent consisting essentially of from 10 to 50 parts by weight of a high-molecular-weight surfactant (A) composed of a copolymer of an anhydride of an unsaturated dibasic acid with a vinyl compound copolymerizable therewith, in which the molar ratio of said anhydride to said vinyl compound is from 5/1 to 1/5, in which the degree of polymerization is from 2 to 50 based on said anhydride, in which from 5 to 95% of the acid groups are amidated by an aliphatic amine containing at least one alkyl group having 1 to 22 carbon atoms and the remaining acid groups are converted to salts of an alkali metal, a lower amine, an alkanol amine or ammonia, and (b) from 90 to 50 parts by weight of at least one member selected from the group consisting of:

1. compounds having the formula $$(RO)_m P(OX)_n \quad (1)$$

wherein R is an alkyl or alkenyl group having 8 to 18 carbon atoms or a residue of a condensate of 1 mole of a higher alcohol having 8 to 18 carbon atoms with 1 to 10 moles of ethylene oxide, X is hydrogen, metal, a residue of polyethylene glycol wherein the mole number of ethylene oxide is 1 to 5, ammonium or organic group-substituted ammonium, and $m$ and $n$ are integers of 1 to 2 with the proviso that the sum of $m$ and $n$ is 3, 2. compounds having the formula

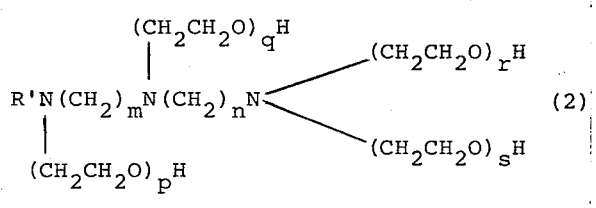

wherein R' is alkyl, alkenyl or acyl group having 8 to 18 carbon atoms, $p$, $q$, $r$ and $s$ are integers of 0 to 5 with the proviso that the sum of $p$, $q$, $r$ and $s$ is 1 or more, and $m$ and $n$ are integers of 1 to 3, 3. compounds having the formula

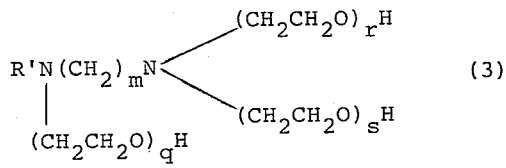

wherein R', $m$, $q$, $r$ and $s$ are as defined in above formula (2), and (4) compounds having the formula

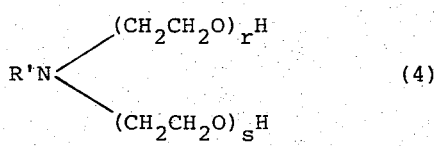

wherein R', r and s are as defined in above formula (2), and then aging said filament yarn to impart thereto an improved interfiber cohesion to minimize separation of fibers during subsequent filament yarn manufacturing steps.

2. A method as claimed in claim 1, in which said high-molecular-weight surfactant (A) is composed of a copolymer of maleic anhydride with a vinyl compound selected from the group consisting of diisobutylene, styrene, vinyl decyl ether and vinyl propionate, in which a part of the acid groups are amidated by an aliphatic amine selected from the group consisting of lauryl amine and octyl amine, the remaining acid groups are converted to salts by a compound selected from the group consisting of potassium, ammonia, sodium and diethanol amine.

3. A method as claimed in claim 1, in which the degree of polymerization of the high-molecular-weight surfactant (A) is within a range of 3 to 20.

4. A method as claimed in claim 1, in which the ratio of said unsaturated dibasic anhydride to said vinyl compound is within a range of from 2:1 to 1:2.

5. A method of improving the interfiber cohesion of filament yarns, which consists essentially of applying 0.5 to 3% by weight of fiber-treating agent to a filament yarn, said fiber-treating agent containing a mixture of (a) a high-molecular-weight surfactant consisting of a copolymer of an anhydride of an unsaturated dibasic acid with a vinyl compound copolymerizable therewith, in which the molar ratio of said anhydride to said vinyl compound is from 5/1 to 1/5, in which the degree of polymerization is from 2 to 50 based on said anhydride, in which from 5 to 95% of the acid groups are amidated by an aliphatic amine containing at least one alkyl having 1 to 22 carbon atoms and the remaining acid groups are converted to salts of an alkali metal, a lower amine, an alkanol amine or ammonia, and (b) at least one member selected from the group consisting of:

1. compounds having the formula

wherein R is alkyl or alkenyl having 8 to 18 carbon atoms or a radical of a condensate of 1 mole of a higher alcohol having 8 to 18 carbon atoms with 1 to 10 moles of ethylene oxide, X is hydrogen, metal, a polyethylene glycol radical wherein the mole number of ethylene oxide is 1 to 5, ammonium or organic group-substituted ammonium, and $m$ and $n$ are integers of 1 to 2 with the proviso that the sum of $m$ and $n$ is 3, 2. compounds having the formula

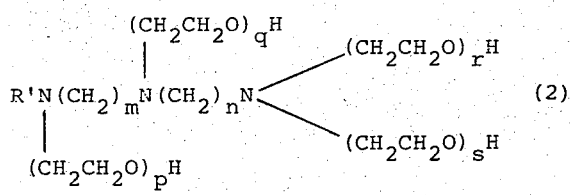

wherein R' is alkyl, alkenyl or acyl having 8 to 18 carbon atoms, $p$, $q$, $r$ and $s$ are integers of 0 to 5 with the proviso that the sum of $p$, $q$, $r$ and $s$ is 1 or more, and $m$ and $n$ are integers of 1 to 3, 3. compounds having the formula

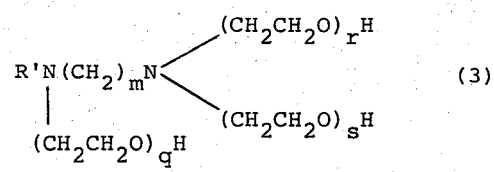

wherein R', $m$, $q$, $r$ and $s$ are as defined in above formula (2), and (4) compounds having the formula

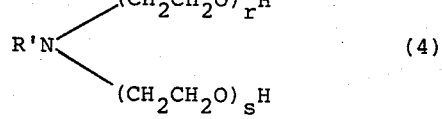

wherein R', $r$ and $s$ are as defined in above formula (2), the weight ratio of (a) to (b) being from 10 to 50 parts by weight of (a) per 90 to 50 parts by weight of (b), the amount of (a) and (b) applied to the filament yarn being an amount effective to increase the interfiber cohesion of the filament yarn, and then aging said filament yarn to impart thereto an improved interfiber cohesion to minimize separation of fibers during subsequent filament yarn manufacturing steps.

* * * * *